United States Patent [19]
Freeman et al.

[11] Patent Number: 5,550,328
[45] Date of Patent: Aug. 27, 1996

[54] ELECTRONIC SCALE RECALIBRATING DEVICE CONSISTING OF A MOVEABLE CALIBRATION WEIGHT

[75] Inventors: Gerald C. Freeman, Norwalk; Paul C. Talmadge, Ansonia, both of Conn.

[73] Assignee: Pitney Bowes Inc., Stamford, Conn.

[21] Appl. No.: 165,151

[22] Filed: Dec. 10, 1993

[51] Int. Cl.⁶ .......................... G01C 17/38; G01G 19/52; G01G 9/00
[52] U.S. Cl. .......................... 177/50; 177/210 FP; 177/1; 73/1 B
[58] Field of Search .................................. 73/1 B; 177/1, 177/50, 210 FP

[56] References Cited

U.S. PATENT DOCUMENTS

| | | | |
|---|---|---|---|
| 4,156,361 | 5/1979 | Melcher et al. | 73/1 B |
| 4,343,373 | 8/1982 | Stadler et al. | 177/50 |
| 4,425,975 | 1/1984 | Lüchinger | 177/50 |
| 4,651,838 | 3/1987 | Hamilton et al. | 177/209 |
| 4,660,663 | 4/1987 | Amacher et al. | 177/50 |
| 4,760,539 | 7/1988 | Amacher et al. | 364/571 |
| 4,836,308 | 6/1989 | Davis et al. | 177/25.14 |
| 4,909,338 | 3/1990 | Vitunic et al. | 177/50 |
| 4,932,486 | 6/1990 | Komoto et al. | 177/50 |
| 4,932,487 | 6/1990 | Melcher et al. | 177/50 |
| 4,977,969 | 12/1990 | Leisinger et al. | 177/50 |
| 5,148,881 | 9/1992 | Leisinger | 177/50 |
| 5,191,543 | 3/1993 | Berthel et al. | 177/50 X |
| 5,307,281 | 4/1994 | Wollmann | 177/25.15 X |

Primary Examiner—Brian W. Brown
Assistant Examiner—Randy W. Gibson
Attorney, Agent, or Firm—Angelo N. Chaclas; Robert H. Whisker; Melvin J. Scolnick

[57] ABSTRACT

An electronic scale is disclosed having a device for recalibrating the scale from time to time after the scale is moved from the factory to a site of installation in order to adjust the scale for physical and/or environmental operating conditions which are different from those which prevailed at the factory when the scale was originally calibrated after the completion of manufacture and which have an adverse effect on the accuracy of the scale if the scale is not recalibrated under these conditions. The scale is provded with a device which adds a predetermined fixed weight to the load cell of the scale at any desired time or interval of time, and an electronic count indicative of this weight at the site of installation is compared with an electronic count of the same weight taken at the factory and stored in a memory, and the digital readout of the scale is then adjusted by an amount which is the same as the ratio of the original count of the weight and the count thereof taken at the site of installation.

11 Claims, 8 Drawing Sheets

ELECTRONIC SCALE RECALIBRATING DEVICE CONSISTING OF A MOVEABLE CALIBRATION WEIGHT

BACKGROUND OF THE INVENTION

This invention relates generally to the field of electronic weighing scales, and more particularly to an electronic weighing scale having a device therein for automatically recalibrating the scale to compensate for the effects on the accuracy of the scale of variations in physical and/or environmental conditions under which the scale operates.

This application is related to copending application Ser. No. 08/165,152, filed concurrently herewith on Dec. 10, 1993, in the names of Gerald C. Freeman and Paul C. Talmadge, and assigned to the assignee of this application.

Since their introduction, electronic scales have become widely accepted in many weighing applications for a number of reasons, primarily the extreme degree of accuracy with which the scales can weigh articles, the wide range of weights the scales are capable of handling and the ease and convenience of digital display readout of the weight of an article. Electronic scales are now used almost exclusively in such high volume utility situations as mail, parcels, bulk food and dry goods sold by weight measure, air terminal baggage, and other situations where highly accurate weight is required on a repetitive basis with minimum recovery time between individual weighings.

In recent years, electronic scales have become almost the universal standard in connection with weighing mail and parcels, and it is in connection with this utility that the present invention was developed, although the utility of the present invention is by no means limited to this use. Perhaps the primary contributing factor to the popularity of electronic scales in the postal field is the high degree of accuracy inherent in such scales. When one considers the billions of mail pieces weighed anually by the U.S. Postal Service in the course of handling mail, and the millions of packages and parcels also handled not only by the Postal Service but also by all of the special delivery courier services which compete with the Postal Service, one can begin to appreciate the vast amount of money by which customers will be overcharged or undercharged, depending on whether scales are overweighing or underweighing in particular circumstances, in the course of dispatching all of this mail and parcels, if the scales which determine the mail and parcel postage amount are not highly accurate.

For example, a generaly accepted standard of accuracy among major electronic scale manufacturers is that they be within 0.03% to 0.05% of full scale capacity. If we assume a 100 pound scale, the required accuracy becomes 0.03 to 0.05 pounds, or 0.48 to 0.80 onces, at the upper ranges of the scale, and one half of that in the lower ranges. Thus, it is apparent that electronic scales are capable of weighing accurately to an impressive less than one ounce in 100 pounds. Correspondingly, a one pound letter scale should weigh letter mail accurately to within less than one one hundreth of an ounce.

Aside from an inherent desire to provide highly accurate scales for monetary purposes described below, a major factor contributing to this high degree of accuracy is the requirement by the National Bureau of Weights and Measures that a scale be capable of weighing within the above limits of accuracy in order to be approved for commercial use in mail and parcel applications. Although many customers in other applications may not require this degree of accuracy, customers in the mail and parcel fields will not purchase scales that are not capable of having National Bureau of Weights and Measures approval.

A major problem that occurs with electronic scales is that the accuracy of electronic scales can be adversely affected by variations of certain physical and/or environmental conditions under which the scales are required to operate. The primary physical condition is that an electronic scale must be level during operation or it will not weigh accurately. Thus, if a scale is properly calibrated at the factory on a test bench known to be perfectly level, and is then transported to the field and operated on a surface that is not level, the scale will not weigh accurately. A scale resting on a surface which is tipped only a few degrees off of factory test bench level can have a weight discrepancy of as much as 0.4% to 0.5% of full scale capacity, which translates into an accuracy of about 10 times less than the above mentioned industry standard. The reason for this is that when a scale is perfectly level, an article resting on the platform of the scale is exerting 100% of its weight in a perfectly vertical direction relative to gravity, so the scale recognizes the full weight of the article. If the scale is tipped slightly, the weight of the article recognized by the scale is no longer 100%, but rather is only a component of the weight as determined by the cosine effect, one minus the cosine of the angle that the scale is off level. The result is that the scale reads less than the true weight of the article by the amount of the above percentages, which becomes very substantial in terms of lost revenue from underweighing millions of parcels. This problem is particuarly acute in the situation where a courier service wishes to place a scale in the back of its pickup truck in order to check the accuracy of package weight provided by the customer prior to the package being delivered to the distribution center of the courier service. It is rare that a parked truck will be absolutely level, with the result that a substantial degree of error is introduced into the weight provided by the customer.

The problem is further compounded by the introduction of various environmental factors, such as variations in gravity, vibration and temperature. For example, it is known that the force of gravity varies from place to place around the world, with the result that a scale properly calibrated at the factory may not be accurate within the desired limits after it is transported a few hundred or a few thousand miles. Also, the effect of gravity varies with height, so that a scale calibrated properly at sea level may not be as accurate within the desired limits in Denver. A scale properly calibrated in an air conditioned factory at a temperature of 75° F. will not be accurate when used in a non-air conditioned location with an ambient temperature of 98° F.

Prior to the present invention, the only way to ensure that a particular scale would weigh accurately in the field was to dispatch a service technician of the scale manufacturer to the site of the scale for the purpose of recalibrating the scale after it is installed and is operating under the conditions which appertain. This obviously is not an acceptable solution since it is not a cost effective procedure, it does not solve the problem of changing circumstances at the scale site such as those mentioned above, it does not solve the problem of transitory scales such as those installed in the backs of courier service trucks, and finally it is difficult on the service technicians who must carry anywhere from 50 to 100 pounds of weight to the site of the scale in order to perform the calibration.

Thus, from the foreging it is seen that there exists a need for an effective way of recalibrating an electronic scale in the field to compensate for errors in weight which are introduced by the adverse effects of physical and/or environmental conditions under which the scale operates.

BRIEF DESCRIPTION OF THE INVENTION

The present invention satisfies the foregoing need and at the same time obviates if not eliminates all of the problems discussed above relating to the accuracy of electronic scales, and does so in a unique, highly reliable and cost effective manner.

The principles of the present invention are embodied in a device which is incorporated into an electronic scale which has a platform on which an article to be placed is weighed, a load cell responsive to movement of the platform for generating signals indicative of the weight of the article, a digital readout for indicating the weight of the article and a microporcessor for converting the signals from the load cell into digital information recognizable by the readout. In this environment, the present invention is embodied in a device for recalibrating the scale to compensate for the effects on the accuracy of the scale of variations in physical and/or environmental conditions under which the scale is operating.

In its broader aspects, the recalibrating device comprises an object having a predetermined fixed weight disposed in the scale, means mounting the object for movement between an inoperative position in which the weight is ineffective and an operative position in which the weight is effectively applied to the platform of the scale, and means for moving the weight between the operative and inoperative positions. There is a memory storage means, which can be either in the scale microprocessor or in a seprate microprocessor dedicated to the recalibration device, for storing an electronic count which is indicative of the actual weight of the object, and a means for recording an electronic count of the weight of the object when it is moved to the active position. There is a comparator means for comparing the electronic count of the actual weight of the object which is stored in the memory with the recorded electronic count of the weight of the object when it is in the operative position. Finally, there is means for adjusting the weight displayed on the digital readout of an object placed on the scale platform by the ratio of the stored electronic count to the recorded electronic count, the result being that the scale is recalibrated to provide an accurate readout of the weight of an article placed on the scale platform regardless of variations in physical and/or environmental conditions under which the scale is operating which affect the accuracy of the scale.

In some of its more limited aspects, the invention includes motorized means for alternately moving the object from the inoperative position to the operative position for recalibration of the scale and then back to the inoperative position. When in the inoperative position, the object is suspended from the shaft of a motor which is supported by the base of the scale, and when in the operative position, the object is suspended from a bracket means which is effectively connected to the load cell of the scale so that the weight of the object is effectively placed on the load cell. The device includes cooperating support means on the object and the bracket means to center the object in a lateral direction to ensure that the object will always be in the exact same position relative to the load cell each time it is moved to the operative position. The device also includes cooperating abutment means on the object and on the support means therefor which both centers the object in a longitudinal direction when it is in the inoperative position, and also prevents the object from moving when it is in the inoperative position, thereby assisting in ensuring that the object will always be in the same position relative to the load cell when it is moved to the operative position, and also effectively locking the object against movement during shipping or other movement of the scale.

Having briefly described the general nature of the invention, it is a principal object thereof to provide a recalibration device for an electronic scale which adjusts the electronic controls of the scale to compensate for the adverse effects of physical and/or environmental conditions under which the scale may be operating so that a true weight of articles placed on the scale will be given by the digital readout of the scale.

Another object of the invention is to provide a recalibration device for an electronic scale which is inexpensive to manufacture, requires no operator input or service maintenance, and is highly reliable in operation.

These and other objects, advantages and features of the invention will become more apparent from an understanding of the following detailed description of a presently preferred embodiment of the invention when considered in conjunction with the accompanying drawings.

DETAILED DESCRIPTION OF THE INVENTION

Figure 1:
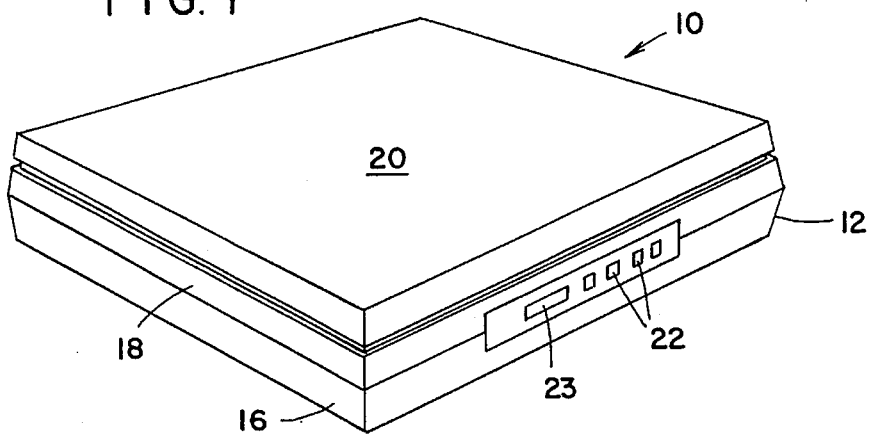
FIG. 1 is a perspective view of a representative scale including an automatic recalibration device utilizing the principles of the present invention.
Figure 2:
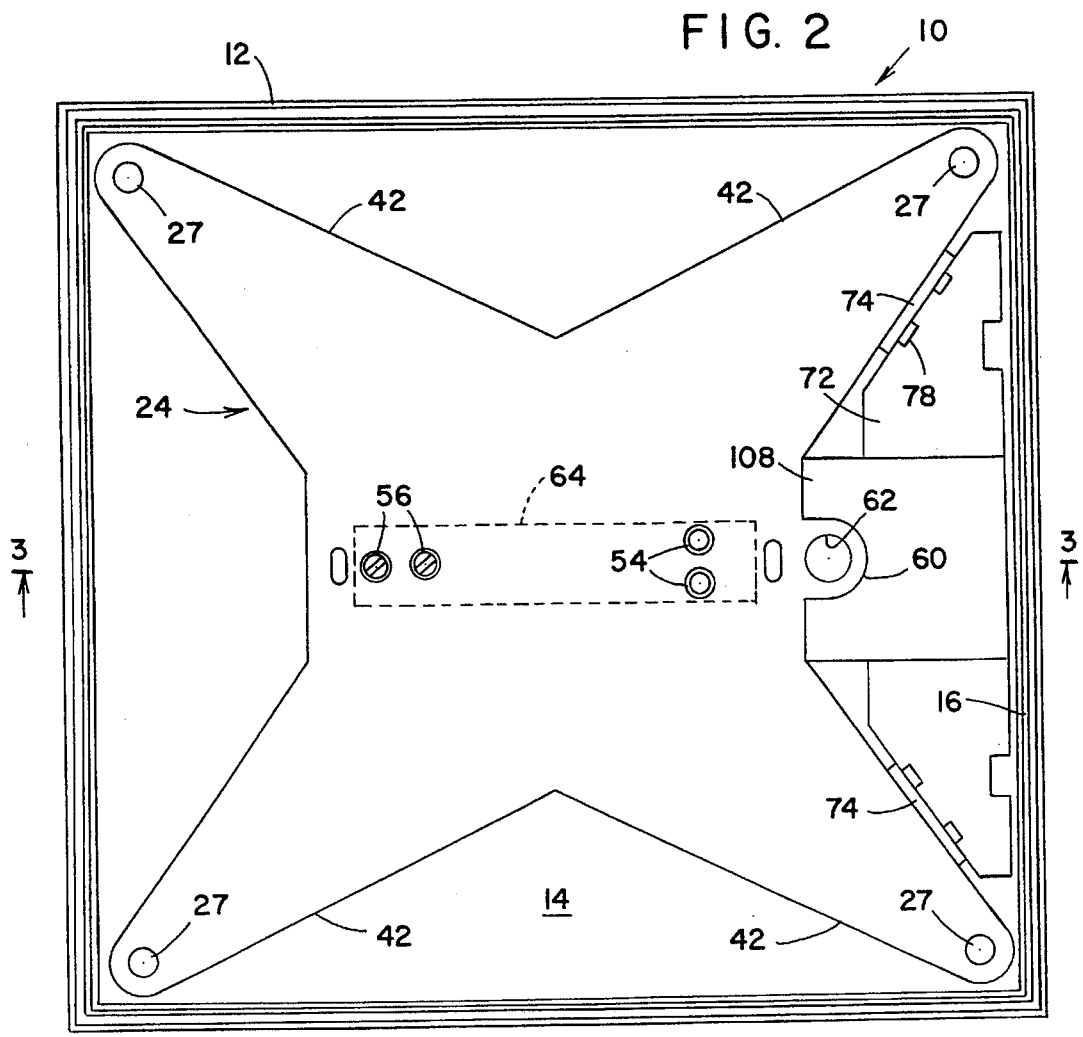
FIG. 2 is a plan view of the scale shown in FIG. 1 with the scale platform removed to reveal interior detail.

Referring first to FIGS. 1 and 2, it will be seen that the recalibrating device of the present invention is incorporated in a scale, designated generally by the reference numeral 10, which is generally rectangular in configuration and includes a base member 12 having a bottom wall 14 and four upstanding side walls 16, the bottom wall and side walls generally forming an open top housing for supporting the operational elements of the scale as seen hereinafter. An intermediate frame 18 having the same peripheral configuration as the base 12 is suitably secured to the base 12 and partially encloses portions of the operational elements that project above the walls 16 of the base 12. A platform 20 having the same peripheral configuration as the base 12 and intermediate frame 18, is mounted over the intermediate frame 18, but not in contact therewith, but rather rests on one of the operational elements of the scale 10 as described hereinafter. The intermediate frame 18 also includes openings 22 through which various control buttons project and a digital readout 23 to indicate the weight of an article placed on the platform 20.

Figure 3:
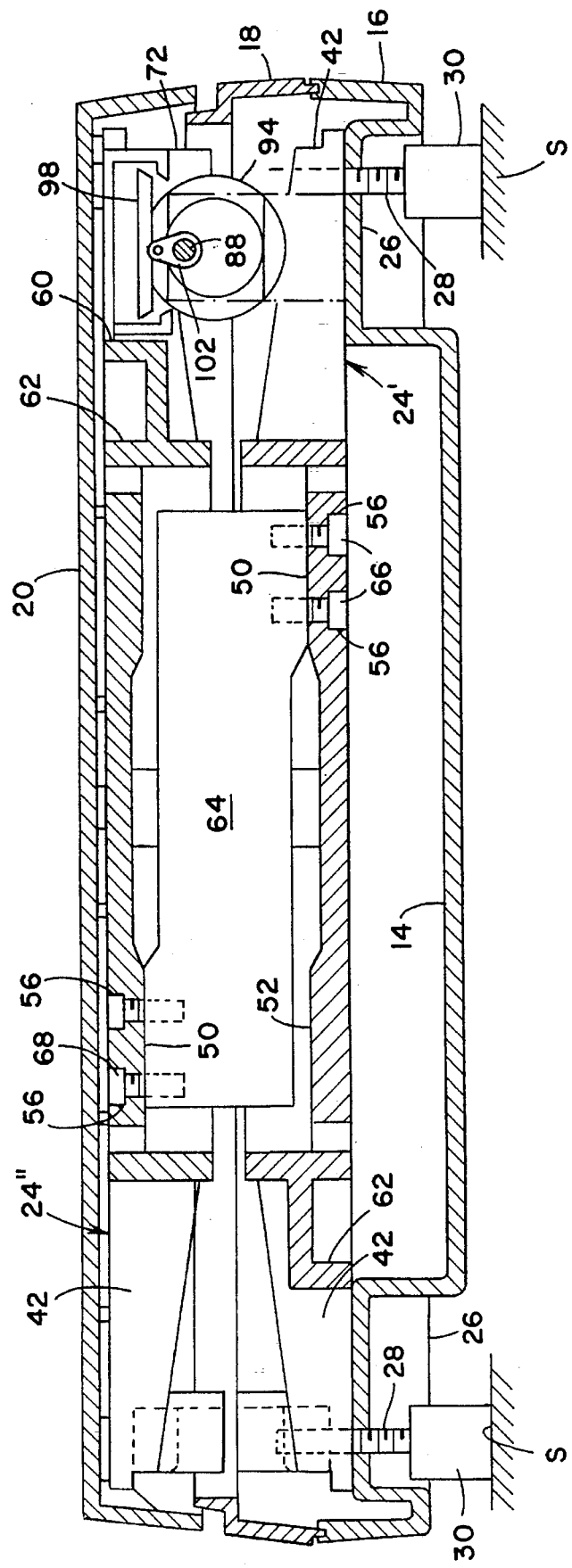
FIG. 3 is a sectional view taken on the line 3—3 of FIG. 2.
Figure 4:
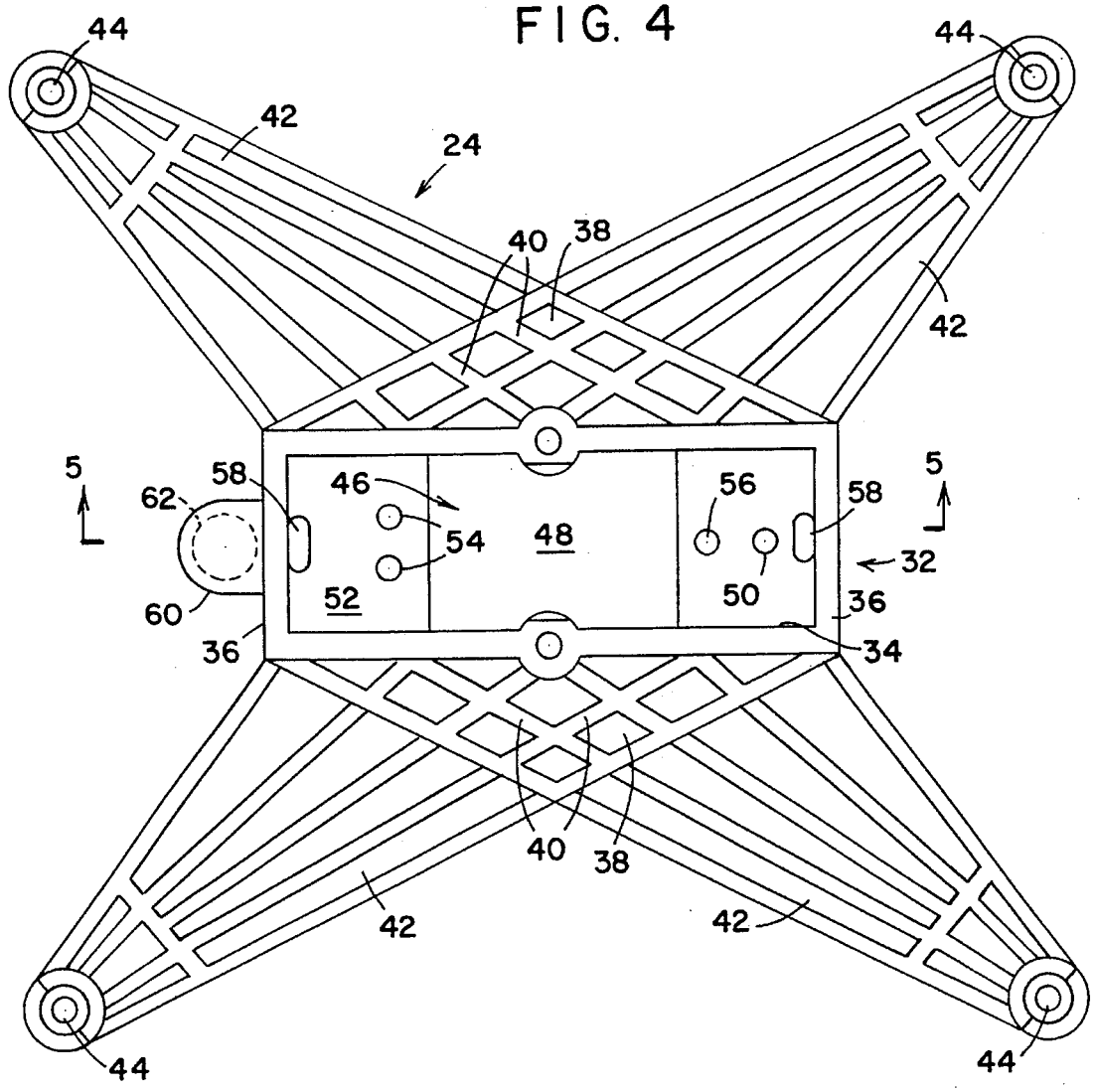
FIG. 4 is a bottom view of one section of a load cell supporting member.

As best seen in FIGS. 3, the base 12 does not rest on the supporting surface S, but rather is suspended slightly above the supporting surface S by being attached in a suitable manner to a load cell supporting member, designated generally by the reference numeral 24 in FIG. 2 and described in more detail below. The bottom wall 14 of the base 12 has an upstanding protuberance 26 which extends around substantially the entire periphery of the base 12 and on which the load cell supporting member 24 rests. Corner portions of the load cell supporting member 24 are provided with threaded holes 27 which receive correspondingly threaded leveling screws 28, which extend through holes 29 in the base 12 and the outer ends of which are covered with rubber feet 30 to provide a suitable cushion for the scale. Obviously, the scale can be leveled by turning any one or more of the leveling screws 28 to raise or lower the feet 30 with respect to the base 12.

Figure 5:
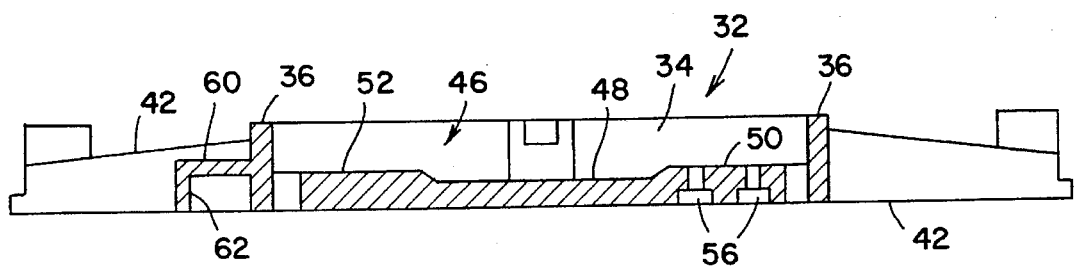
FIG. 5 is a sectional view taken on the line 5—5 of FIG. 4.
Figure 6:
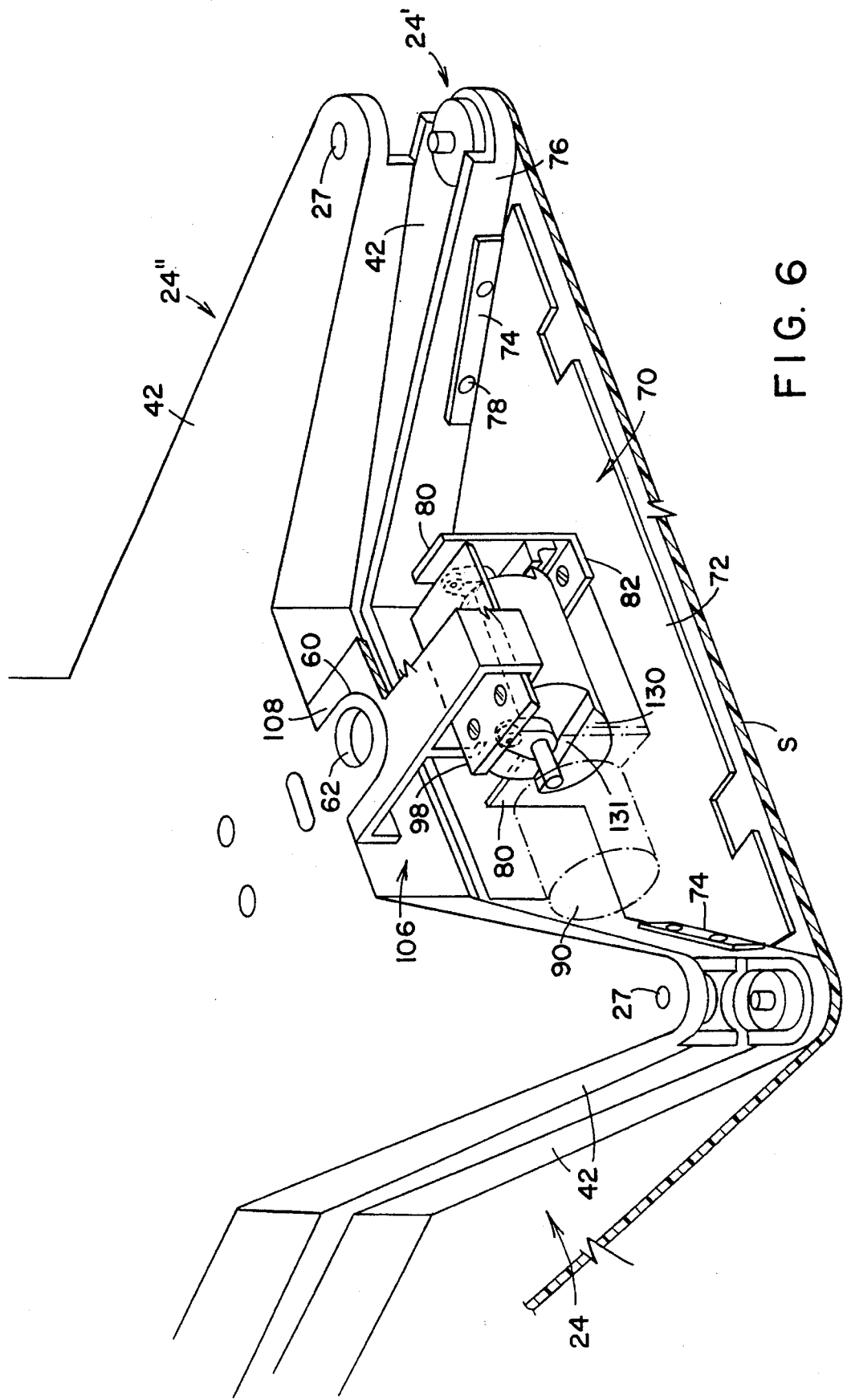
FIG. 6 is is a perspective view of the scale recalibrating device mounted in the scale.

With reference to FIGS. 2 through 5, the load cell supporting member 24 is seen to comprise two identical load cell supporting members 24' and 24", one of which is seen in FIGS. 5 and 6. Thus, each member comprises a generally rectangular central portion, designated generally by the reference numeral 32, which has opposed long walls 34 and opposed short walls 36. The walls 34 and 36 form a walled perimeter of the central portion 32. Adjacent each of the long walls 34 is a triangular webbed portion 38 which includes webbing ridges 40. Two arms 42 extend diagonally from each webbed portion 38, with the result that the four arms 42 extend radially from the central portion 32 toward the four corners of the scale. The outer ends of the arms 42 are provided with the aforementioned threaded holes 27 which receive the leveling screws 28.

The central portion 32 includes an upwardly opening chamber 46 which encompasses the space between the long walls 34 and the short walls 36. The floor 48 of the chamber 46 includes spaced apart pads 50 and 52. The pad 52 includes paired circular clearance holes 54, and the pad 50 includes paired circular clearance holes 56. Elongate clearance holes 58 are formed respectively in pads 50 and 52 and are adjacent the short walls 36. All of the aforementioned holes extend completely through the floor 48 of the chamber 32. The circular holes 54 or 56, depending on the type of load cell used, are for mounting a load cell to each of the load cell supporting members 24' and 24". The elongate holes 58 are to accommodate passage of electrical lead wires (not shown) from a load cell to the scale electronics (also not shown). As best seen in FIGS. 5 and 6, the central portion 12 is provided with a longitudinal extension 60 from one of the short walls 36 which is provided with a recess 62 for receiving and holding an optional bubble level to assist in leveling the scale by turning the leveling screws 28.

The chamber 46 receives a load cell 64, which is a conventional low profile load cell; its internal structure, including flexure members, strain gages and associated wiring, is well known to those skilled in the art and the details thereof form no part of the present invention; therefore these details are not further illustrated or described. The model PW 2C3 load cell, available from Hottinger Baldwin Measurements, Inc., Marlboro, Mass., and the model 1040 load cell, available from Tedea, Inc., Canoga Park, Calif., are two examples of a type of load cell that may be used with the scale 10.

As best seen in FIG. 3, the load cell 64 is captured in the enclosed space defined by the chambers 46 formed on each of the load cell supporting members 24' and 24" respectively. The load cell 64 rests on the raised pad 50 of the lower supporting member 24' and is attached thereto by a pair of screws 66 which pass through the openings 56 and are threadedly received in the load cell 64. The raised pad 50 of the other load cell supporting member 24" rests on the upper surface of the load cell 64 and is secured thereto by another pair of screws 68 which pass through the apertures 56 on this load cell supporting member. Thus, by this arrangement both of the load cell supporting members 24' and 24" are secured together to form the integral unit load cell supporting member 24 with the load cell 64 captured therebetween. This integral assembly is then inserted into the base 12 by inserting the leveling screws 29 and feet 30 through the holes 29 in the base 12 and securing the base 12 to the underside of the load cell supporting member 24' by any suitable means.

Referring now to FIGS. 6 through 11, the recalibrating device of the present invention, indicated generally by the refrerence numeral 70 in FIG. 6, functions, in a manner more fully described below to periodically add a predetermined weight to the effective weighing mechanism of the scale so that a combination of discrete arithmetic processing components, such as a microprocessor, can ascertain whether the scale is reading the weight of objects placed on the scale platform with the same degree of accuracy with which the scale measured weight when it was originally calibrated at the factory. Thus, the recalibrating device comprises an elongate base plate 72 shaped to fit between two of the arms 42 of the lower load cell supporting member 24' and rest on the upstanding protuberance 26 of the base 12. The base plate 72 is secured to the lower load cell supporting member 24' by means of a pair of upstanding flanges 74 which are secured to the side edge 76 of the adjacent arms 42 of the member 24' by any suitable means, such as the screws 78.

Figure 7:
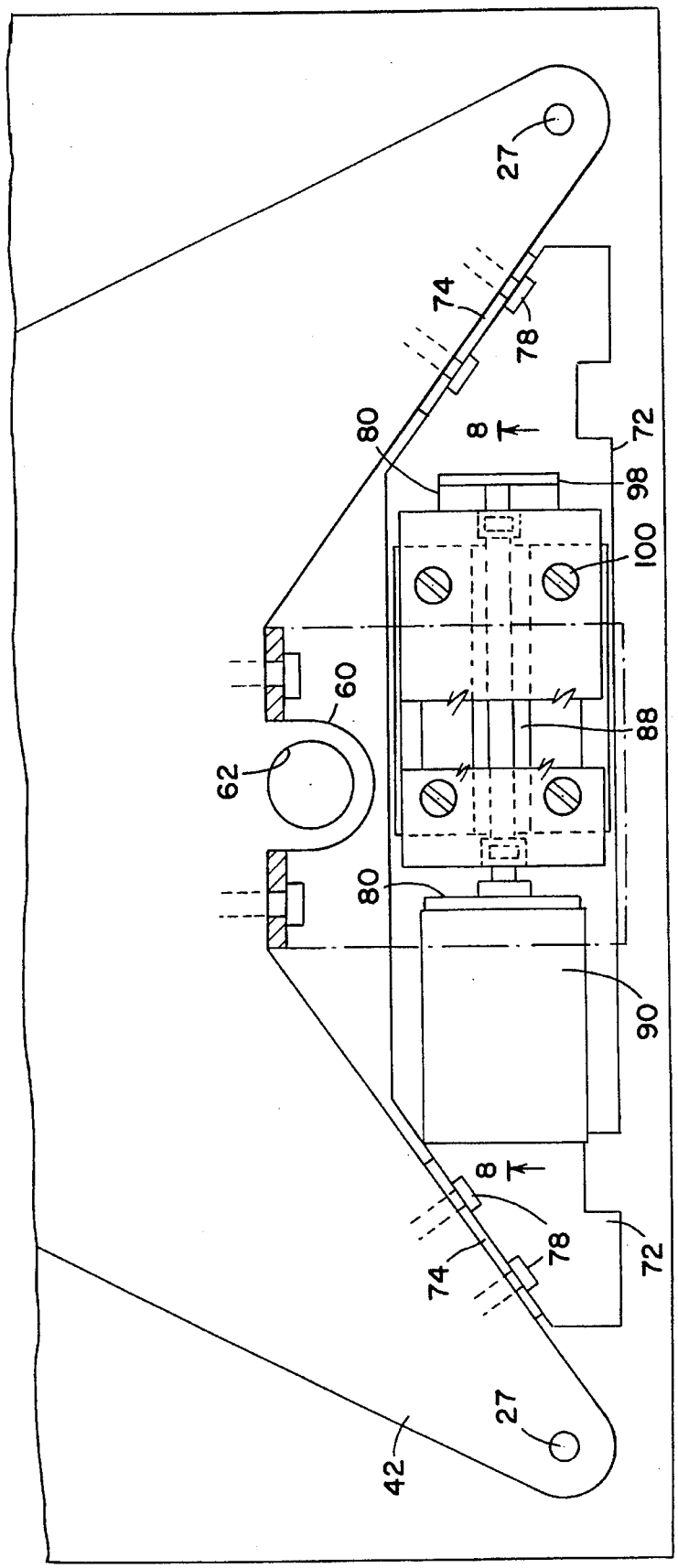
FIG. 7 is a plan view of the scale recalibrating device.
Figure 8:
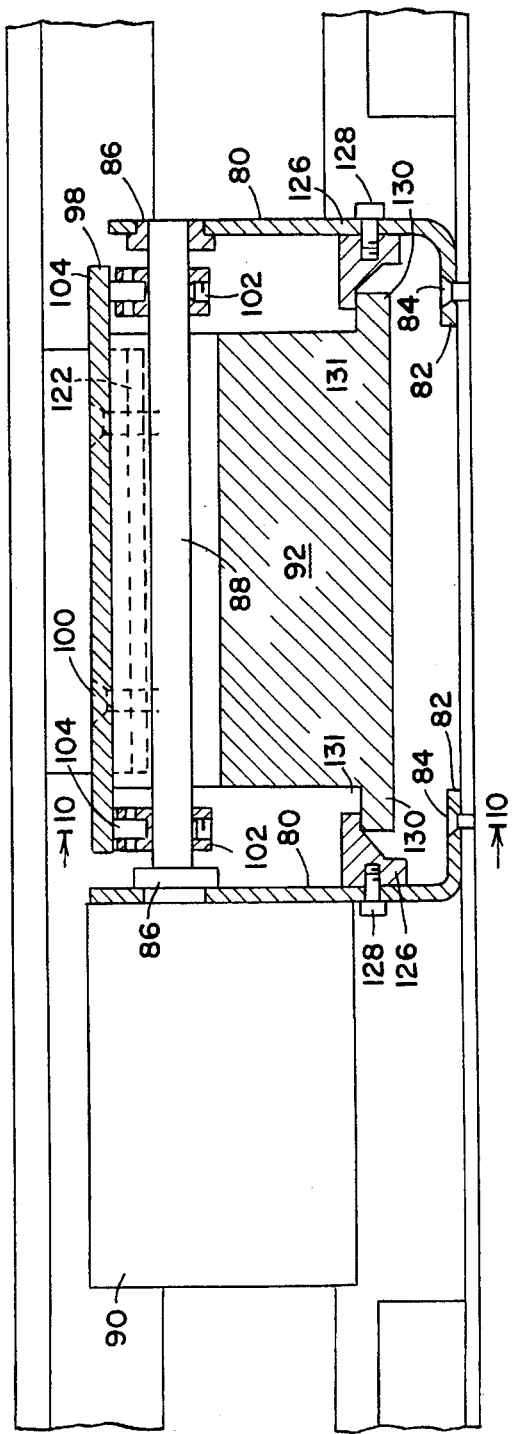
FIG. 8 is a a sectional view taken on the line 8—8 of FIG. 7 showing the recalibrating weight in its normal or inoperative position.
Figure 10:
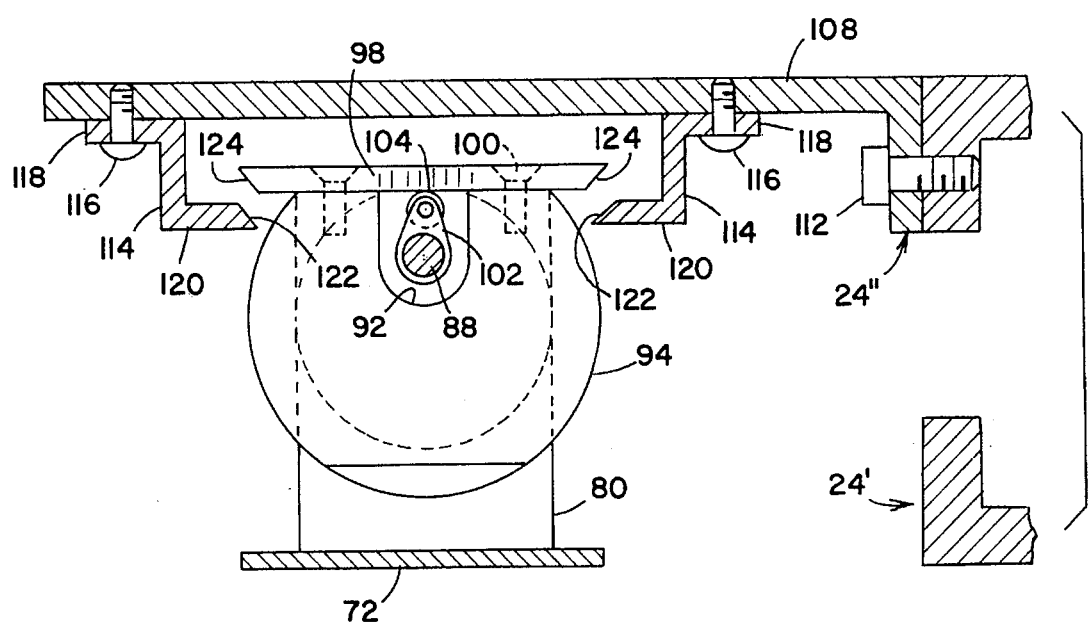
FIG. 10 is a sectional view drawn to an enlarged scale taken on the line 10—10 if FIG. 9 showing the recalibrating weight in its normal or inoperative position.
Figure 11:
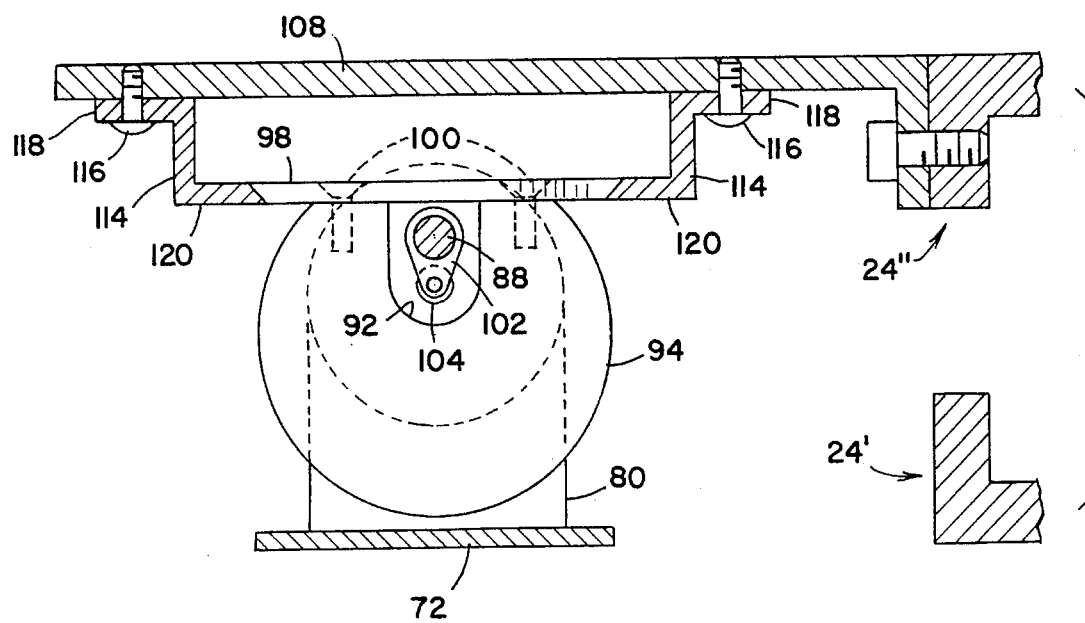
FIG. 11 is a view is a view similar to FIG. 10 but showing the recalibrating weight in its active or operative position.

A pair of upstanding plates 80 are secured to the base plate 72 by means of horizontal flanges 82 which are connected to the base plate 72 by the screws 84. The plates 80 support a mechanism for alternately moving an object having a fixed predetermined weight from an inoperative position in which the object is merely suspended on the plates 80 and hence on the lower load cell supporting member 24', to an operative position in which the object is effectively resting on the upper load cell supporting member 24" so that the weight of the object is effectively added to the upper load cell supporting member 24" and therefore is measuredly the load cell 64. Thus, as best seen in FIGS. 7 and 8, the upstanding plates 80 have shaft bearings 86 mounted therein which rotatably support a shaft 88, the shaft being connected to and turned by a small gear motor 90, which can be powered by any suitable internal or external source of electricity. The shaft 88 passes through a groove 92 formed in the upper portion of a generally cylindrical shaped object 94 which has a flat upper surface 96, as best seen in FIGS. 10 and 11. A flat plate 98 overlies the flat upper surface 96 of the object 94 and is secured thereto by the screws 100, thereby completely enclosing the shaft 88 within the groove 92. A pair of eccentric cams 102 are fixed on the shaft 88 adjacent opposite ends thereof, each cam rotatably supporting a cam roller 104. The flat plate 98 extends beyond the ends of the object 94 sufficiently far to overlie the cams 102, as best seen in FIGS. 8 and 9.

The weight of the object 94 is applied to the scale by a supporting bracket, indicated generally by the numeral 106 in FIG. 6. The bracket 106 comprises a generally horizontal top plate 108 having a pair of depending flanges 110 disposed on both sides of the extension 60 of the upper load cell supporting member 24" and secured to the side wall thereof as by the screws 112. The top plate extends outwardly far enough to completely overlie the entire recalibrating device, and a pair of somewhat Z-shaped plates 114 are secured to the underside of the top plate 108 on either side of the object 94 as by screws 116 passing through upper horizontal flanges 118. The Z-shaped plates have lower horizontal flanges 120 which project inwardly and terminate in spaced apart slanted surfaces 122, as best seen in FIG. 10. The plate 98, which is attached to the upper surface 96 of the object 94, has outer longitudinal slanted surfaces 124 which correspond to the slant on the surfaces 122, the spacing of the slanted surfaces 122 matching the distance between the slanted surfaces 124, so that when the plate 98 is lowered from the position shown in FIG. 10 to the position shown in FIG. 11, the Z-shaped brackets support the plate 98 and the object 94 attached thereto. Thus, the cooperating slanted surfaces 122 and 124 on the lower horizontal flanges 120 and the plate 98 respectively constitute a cooperating support means on the object 94 and the bracket 106 for centering the object 94 in a lateral direction so that the object 94 will be in the exact same position relative to the load cell 64 each time it is moved to the operative position.

Figure 9:
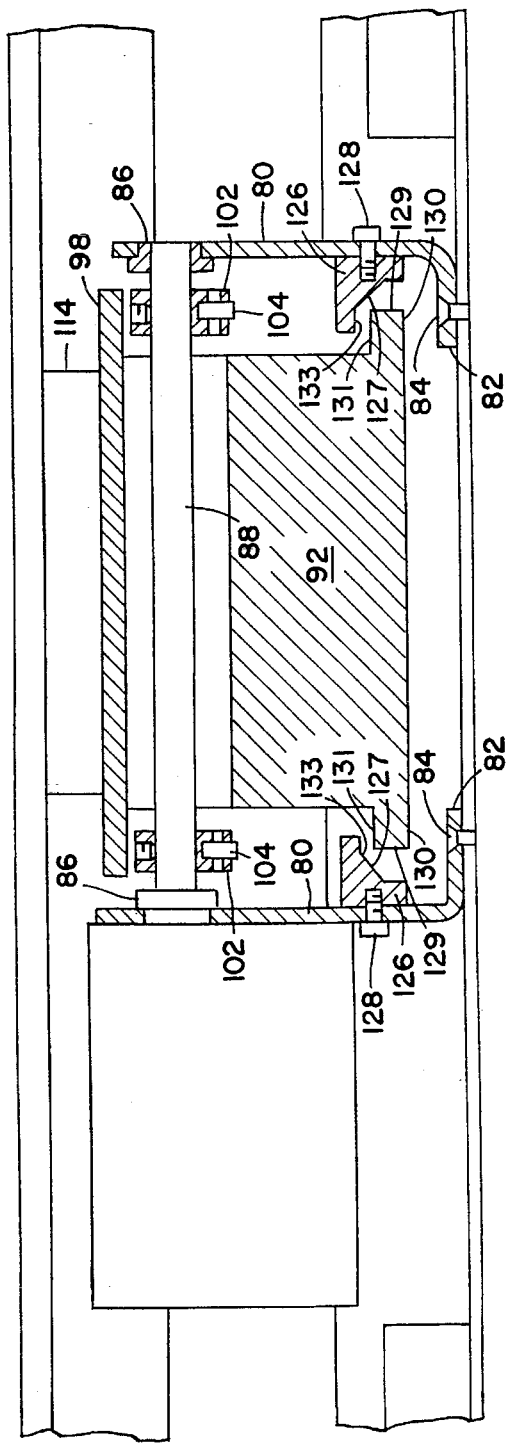
FIG. 9 is a view similar to FIG. 8 but showing the recalibrating weight in its active or operative position.

As best seen in FIGS. 8 and 9, a pair of abutment members 126 are suitably secured as by the screws 128 to the upstanding plates 80, the abutment members 126 having upwardly and inwardly slanted surfaces 127. These surfaces 127 cooperate with the outer edges 129 of outwardly projecting flanges 130 formed on the ends of the object 94 and have flat upper surfaces 131 which mate with the lower surfaces 133 on the abutment members 126 to hold the object 94 in a fixed position when the object is in its inoperative position as shown in FIG. 10. This arrangement both tends to center the object 94 in a longitudinal direction when the object is in the inoperative position so as to assist in ensuring that the object is always in the same position relative to the load cell when it is moved to the operative position, and also locks the object 94 against movement during shipping of the scale and also during periods of use when the scale is not being recalibrated.

The mechanical operation of the recalibrating mechanism 70 is as follows: With the parts in the position shown in FIG. 10, the object 94 is in its inoperative position since the plate 98 is resting on the cam rollers 104, thereby transferring the weight of the plate 98 and the object 94 to the shaft 88, upstanding plates 80 and the base plate 70 secured to the lower load cell supporting member 24'. When the motor 90 rotates the shaft 88 in a counter clockwise direction as viewed in FIG. 10, the eccentric cams 102 move the cam rollers 104 out of contact with the underside of the plate 98 and allow the plate 98 to move downwardly until the slanted surfaces 124 on the plate 98 rest on the slanted surfaces 122 on the lower flanges 120 of the Z-shaped plates 114, thereby placing the object 94 in its operative position as shown in FIG. 11. This effectively transfers the weight of the plate 98 and the object 94 to the upper load cell supporting member 24", which in turn transfers the weight to the load cell 64 so that the scale is now weighing the object 94 and plate 98. Reversing the rotation of the shaft 88 by the motor 90 returns the object 94 and plate 98 to the inoperative position of FIG. 10.

Figure 12:
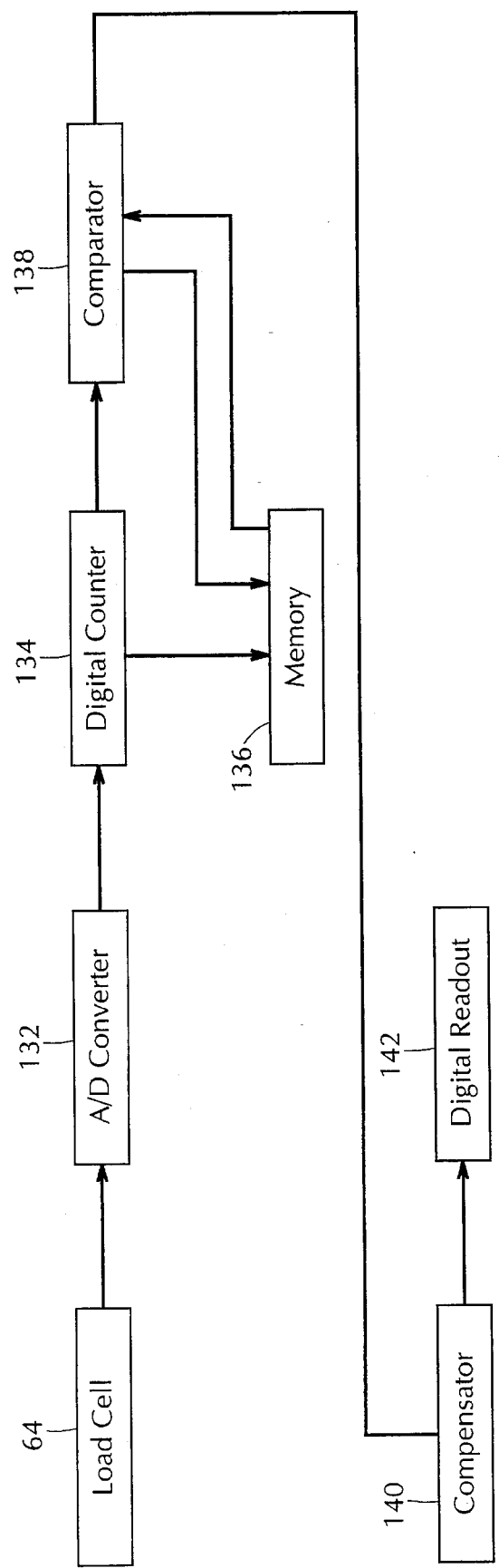
FIG. 12, is a schematic diagram of the major electronic control components of the present invention.

FIG. 12 represents schematically what occurs in the microprocessor of the scale when the weight of the object 94 and the plate 98 are applied to the load cell 64 of the scale, both at the factory when the scale is initially calibrated prior to shipment, and later at a site of installation or use when the scale is being recalibrated. The operating components of the microprocessor are not described or shown in detail since these details form no part of the present invention and are microprocessor components known in the art. At the factory, the completely manufactured scale is placed on a surface that is known to be perfectly level with respect to gravity, and the motor 90 is rotated to bring the object 94 to its operative position as shown in FIG. 11. The weight of the object, which need not be known (although it is generally about two pounds) but which must be absolutely invariable, is sensed by the load cell 64, which sends a votage indicative of the weight of the object 94 and plate 98 to an analog/digital converter 132, which sends a digital signal to the electronic counter 134. Analog/digital converter 132 converts the analog voltage signal supplied by the load cell to a corresponding digital signal in any conventional manner. Such converters are well known in the art. At the factory, the count representing the weight of the object 94 and plate 98 are stored and retained in a memory 136.

After the scale is shipped to an installation site, regardless of whether that site is fixed or is in a vehicle and subject to constant change, it is likely, almost certain, that the physical and/or environmental conditions prevailing at the site of installation will be different from those that prevailed at the factory, and hence the scale will not weigh accurately for any one or more of the reasons discussed hereinabove. Accordingly, the scale must be recalibrated. This is accomplished by actuating the motor 90 to rotate the shaft 88 to move the object 94 and plate 98 to the operative position as shown in FIG. 11. The load cell 64 again weighs the object 94 and plate 98 and sends the weight indicative signal to the analog/digital converter 132 which in turn sends the digital signal to the digital counter 134. The counter 134 now sends a signal indicative of the weight count of the object to a comparator 138 which seeks the count previously stored in the memory 136 and compares that count with the count just recorded from the counter 134. The comparator 138 then calculates the ratio of the count stored in memory to the count just recorded, and transfers that ratio to a compensator 140. The compensator 140 then adjusts the electronic control of the readout 142 by an amount that bears the same ratio as that of the original memory count of the weight of the object to the newly recorded count, so that the readout 142 will now indicate the accurate weight of any article placed on the scale platform 20.

As an example of the foregoing, assume that the scale has a 100 lb. capacity, and that the electronics have determined that the 100 lbs is equivalent to an electronic count of 600,000 units. After the electronics have determined absolute zero, the recalibration device 70 is then activated, and the counter 134 may register a count of 53,492 units. This is the count that is put into the memory 136 and remains there permanently. When the scale is moved to an installation site, let us assume that gravity is slightly weaker at the installation site than it was at the factory site, so that when the recalibration device is operated at the installation site, the object 94 and plate 98 will weigh slightly less, and a count is recorded at 52,982. This count is transferred to the comparator 138 which compares it with the count stored in the memory 136 and calculates a ratio of the count stored in the memory 136 to the count just recorded, which in the case of the above figures would be 1.0096259. The compensator 140 uses this ratio to adjust the electronic control of the readout 142 to what the readout would have been at the factory. Assuming that a package is put on the scale which would have weighed exactly 50 lbs. at the factory when the scale was accurately calibrated, at the installation site the scale would indicate the package as weighing slightly less than 50 lbs., actually, 49.52329 lbs., slightly less than one half pound under true weight, without the recalibrating device of this invention. However, the comparator 140 will now adjust the electronic control of the readout by the same ratio as that of the count in memory to the count just recorded of the object os that the readout 142 will actually show 50 lbs. for the article on the scale platform 20.

It is to be understood that the present invention is not to be considered as limited to the specific embodiment described above and shown in the accompanying drawings, which is merely illustrative of the best mode presently contemplated for carrying out the invention and which is susceptible to such changes as may be obvious to one skilled in the art, but rather that the invention is intended to cover all such variations, modifications and equivalents thereof as may be deemed to be within the scope of the claims appended hereto.

We claim:

1. In an electronic scale having a platform on which an article to be weighed is placed, a load cell responsive to movement of the platform for generating a signal indicative of the weight of the article, a digital readout for indicating the weight of the article and a microprocessor for converting the signal from the load cell into digital information recognizable by the readout, a device for recalibrating the scale to compensate for the effects on the accuracy of the scale of variations in physical or environmental conditions under which the scale is operating, said device comprising:

A. an object having a predetermined fixed weight disposed in the scale;
   B. means mounting said object for movement between an inoperative position in which said object is ineffective and an operative position in which said object is effectively applied to the load cell of the scale; said means mounting said object including:
      1. first support means fixedly mounted on the scale for normally suspending said object in said inoperative position, said first support means includes
         a pair of upstanding members spaced apart a distance sufficient for said object to fit between said upstanding members,
         a shaft rotatably supported by said upstanding members for supporting said object in said inoperative position, and
         first abutment means on said object for supporting said object on said shaft, and
      2. second support means effectively connected to the load cell of the scale for supporting said object in said operative position to cause the weight of said object to be effectively applied to the load cell,
   C. means for moving said object between said operative and inoperative positions; and
   D. a microprocessor having:
      1. memory means for storing an electronic count indicative of the actual weight of said object,
      2. means for recording an electronic count of the weight of said predetermined weight when said object is moved to said active position,
      3. comparator means for comparing said stored electronic count with said recorded electronic count, and
      4. means for automatically adjusting the weight displayed on the digital readout of an object placed on the scale platform by the ratio of said stored electronic count to said recorded electronic count,
   whereby the scale is recalibrated to provide an accurate readout of the weight of an article on the scale platform regardless of variations in physical or environmental conditions in which the scale is operating which affect the accuracy of the scale.

2. A device as set forth in claim 1 wherein said second support means comprises
   A. bracket means effectively connected to the load cell of the scale,
   B. abutment means on said bracket means for supporting said object when said object is in said operative position, and
   C. second abutment means on said object for supporting said object on said abutment means of said bracket means.

3. A device as set forth in claim 2 wherein said abutment means on said bracket means and said second abutment means on said object comprise cooperating support means on said bracket means and said object respectively for centering said object in a lateral direction with respect thereto to ensure that said object will always be in the exact same position relative to the load cell when said object is in said operative postion.

4. A device as set forth in claim 3 wherein said cooperating support means comprises cooperating slanted surfaces on said bracket means and said object respectively.

5. A device as set forth in claim 2 wherein said means for moving said object between said operative and inoperative positions comprises
   A. eccentric cam means fixedly mounted on said shaft and contacting said first abutment means on said object, and
   B. means for rotating said shaft, whereby said eccentric cam means raises and lowers said object in response to rotation of said shaft.

6. A device as set forth in claim 1 further including cooperating abutment means on said object and on said first support means for preventing movement of said object when said object is held in said inoperative position.

7. A device as set forth in claim 6 wherein said cooperating abutment means comprises a pair of outwardly projecting flanges mounted on said object and a pair of inwardly projecting flanges mounted on said first support means in position to be contacted by said flanges oil said object when said object is raised from said operative position to said inoperative position.

8. A device as set forth in claim 7 wherein said inwardly projecting flanges on said first support means include a pair of upwardly and inwardly slanting surfaces adapted to be contacted by the outer edges of said outwardly projecting flanges on said object during movement of said object from said operative position to said inoperative position if said object is not centered, thereby assisting in ensuring that said object will always be in the exact same position relative to the load cell when said object is in said operative position.

9. A device as set forth in claim 5, further including cooperating abutment means on said object and on said first support means for preventing movement of said object when said object is held in said inoperative position.

10. A device as set forth in claim 9 wherein said cooperating abutment means comprises a pair of outwardly projecting flanges mounted on said object and a pair of inwardly projecting flanges mounted on said first support means in position to be contacted by said flanges on said object when said object is raised from said operative position to said inoperative position.

11. A device as set forth in claim 10 wherein said inwardly projecting flanges said first support means include a pair of upwardly and inwardly slanting surfaces adapted to be contacted by the outer edges of said outwardly projecting flanges on said object during movement of said object from said operative position to said inoperative position if said object is not centered, thereby assisting in ensuring that said object will always be in the exact same position relative to the load cell when said object is in said operative position.

* * * * *

UNITED STATES PATENT AND TRADEMARK OFFICE
CERTIFICATE OF CORRECTION

PATENT NO. : 5,550,328
DATED : August 27, 1996
INVENTOR(S) : Freeman, et al

It is certified that error appears in the above-indentified patent and that said Letters Patent is hereby corrected as shown below:

Column 6 line 53 delete --measuredly-- and insert --measured by--.

Column 10 line 48 delete --oil-- and insert --on--.

Signed and Sealed this

Seventh Day of January, 1997

Attest:

BRUCE LEHMAN

*Attesting Officer*      *Commissioner of Patents and Trademarks*